United States Patent [19]

Emmons et al.

[11] Patent Number: 5,167,828

[45] Date of Patent: * Dec. 1, 1992

[54] PHOSPHINATE-CONTAINING POLYMERS FOR CONTROLLING SCALE IN UNDERGROUND PETROLEUM-CONTAINING FORMATIONS AND EQUIPMENT ASSOCIATED THEREWITH

[75] Inventors: Daniel H. Emmons, Rosenberg, Tex.; Dodd W. Fong, Naperville; Mary A. Kinsella, Manhattan, both of Ill.

[73] Assignee: Nalco Chemical Company, Naperville, Ill.

[*] Notice: The portion of the term of this patent subsequent to Sep. 1, 2009 has been disclaimed.

[21] Appl. No.: 772,174

[22] Filed: Oct. 7, 1991

[51] Int. Cl.$^5$ ............................................. C02F 5/14
[52] U.S. Cl. .................................. 210/700; 166/310; 166/902; 252/8.552; 252/82; 252/180; 210/747
[58] Field of Search ............................ 166/310, 902; 210/698-701, 747; 252/8.552, 82, 180, 181

[56] References Cited

U.S. PATENT DOCUMENTS

| | | | |
|---|---|---|---|
| 4,590,014 | 5/1986 | Wolf et al. | 210/699 |
| 4,598,092 | 7/1986 | Sasaki et al. | 514/492 |
| 4,604,431 | 8/1986 | Fong et al. | 525/351 |
| 4,678,840 | 7/1987 | Fong et al. | 525/340 |
| 4,681,686 | 7/1987 | Richardson et al. | 210/699 |
| 4,710,303 | 12/1987 | Emmons | 210/698 |
| 4,778,655 | 10/1988 | Greaves | 210/698 |
| 4,913,823 | 4/1990 | Lipinski et al. | 210/698 |
| 4,937,002 | 6/1990 | Bainbridge et al. | 210/701 |
| 5,018,577 | 5/1991 | Pardue et al. | 210/699 |
| 5,092,404 | 3/1992 | Falk et al. | 210/698 |

Primary Examiner—Peter Hruskoci
Attorney, Agent, or Firm—Robert A. Miller; John G. Premo; James J. Drake

[57] ABSTRACT

A method of preventing scale from depositing in underground petroleum-containing formations and upon equipment used to inject into or remove from such formations high brine, scale-forming waters. This method comprises treating such waters with a scale-inhibiting amount of an acrylic acid or acrylamide homopolymer or co-polymer of acrylic acid with acrylamide having a molecular weight within the range of 1,000-50,000 which have been modified to contain up to about 30 mole percent of amido($C_2$–$C_6$ alkyl)phosphinic acid groups and the alkali metal, ammonium and amine salts thereof.

5 Claims, No Drawings

PHOSPHINATE-CONTAINING POLYMERS FOR CONTROLLING SCALE IN UNDERGROUND PETROLEUM-CONTAINING FORMATIONS AND EQUIPMENT ASSOCIATED THEREWITH

BACKGROUND OF THE INVENTION

Inorganic scales that result from the deposition of solid salts from high brine supersaturated solutions injected into and/or removed from underground petroleum bearing formations frequently lead to lost production or well abandonment. Deposits can plug the formation near the wellbore, tubing string, downhole safety valves and other valves, and casing perforations. Subsurface pumps can stick and the operation of surface lines and equipment can be restricted.

Deposition can be initiated by a variety of factors including pressure, pH, temperature, turbulence, surface characteristics, or mixing of incompatible fluids. Incompatible fluids are frequently encountered during water flooding operations. A common factor that causes scale is pressure reduction encountered by fluids as they enter the wellbore during production. The partial pressure of $CO_2$ decreases which can lead to the precipitation of $CaCO_3$.

A variety of scales, both organic and inorganic, cause production problems. Common inorganic scales are calcium carbonate, calcium, barium, and strontium sulfate, and iron sulfides. The calcium salts are the most common.

Scales can either be removed or inhibited. Wells can also be re-perforated in order to circumvent the plugged area. Plugging is often seen at the perforation, where pressure changes are first seen. The well can also be fractured in order to bypass previously scaled areas. Both perforation and fracturing are expensive and only temporary remedies since scales will rapidly re-form.

The most efficient way of dealing with scale is to inhibit its formation. Chemicals can be sequestrants or work as a threshold inhibitor. Sequestrants form combination pairs with a species normally involved in precipitation, such as calcium ions. The interaction with the sequestrant is on a molar basis and therefore requires a large amount of chemical. While effective, this procedure could be cost limiting.

A much more effective chemical treatment is to use a threshold chemical, that is, one that inhibits at a concentration well below equimolar amounts. Threshold chemicals can be effective at concentrations as low as 1/1000th the concentration of the scaling mineral. Precipitation is a complicated process involving supersaturation, nucleation, and crystal growth. An inhibitor can function by one or more mechanisms. It can interfere with the nucleation process or rate. It can interfere with the growth process by blocking crystal growth sites. Crystal growth patterns can be altered. It can also prevent adhesion of crystals to one another or metal walls. In order to be effective, the scale inhibitor must be present during the nucleation stage of crystal growth.

The most common classes of inhibitor chemicals are inorganic phosphates, organophosphorus compounds and organic polymers. The common polyphosphates are sodium tripolyphosphate and hexametaphosphate. Organophosphorus compounds are phosphonic acid and phosphate ester salts. The organic polymers used are generally low molecular weight acrylic acid salts or modified polyacrylamides and copolymers thereof. Phosphonates and polymers are more thermally stable than polyphosphates or phosphate esters. Polyphosphates and phosphate esters hydrolyze at high temperatures forming orthophosphates, the metal salts of which may be more insoluble than the scales that they are intended to inhibit.

The polyphosphates have low brine solubilities and are therefore frequently injected as solids. They can be injected into the well bore by bypass feeders, baskets, filter packs, and bottomhole well packs. They can also be placed into the formation through fractures along with the fracturing fluids. The chemical then dissolves slowly, resulting in a steady, low concentration of inhibitor.

The phosphonates, phosphate esters and polymers are more water soluble and are therefore used as solutions. Either the wellbore or the formation can be treated. Both batch and continuous methods are used for treating the wellbore. They can also be added as a component of a fracturing fluid. These treatments are not optimum, since chemical does not contact the point of initial scale formation—the formation face or casing perforations. However, the tubing string and surface equipment will be treated.

A more efficient and less costly procedure is a "squeeze" treatment, in which the chemical is injected into formation. Production is halted while chemical is injected at a pressure below frac pressure. The chemical optimally penetrates the formation to a distance 1–6 feet radially from the wellbore. Inhibitor will then be released into the wellbore as production is resumed. Ideally, the concentration of inhibitor is constant and low (at a concentration slightly above that required for total inhibition—generally 2–4 ppm). The lifetime of a squeeze depends on the flow rate, oil/water ratio and many other factors but can last for 6 months and even up to 2 years.

The residual concentrations of phosphonates and phosphate esters can be easily and accurately determined in oil field brines by a titration method. However, no accurate method exists for field testing of polymer residuals. Many users are interested in a polymer squeeze but are reluctant to perform one due to the problem of residual determination.

Since precipitation squeezes are believed to be superior to adsorption squeezes, a superior squeeze chemical should be one whose calcium salt has a very low solubility. However, the solubility should not be so low that the concentration of produced inhibitor is below that required for effective scale inhibition.

Also, an inhibitor is needed that will inhibit barium sulfate scale as well as the more common scales. Barium sulfate scale is almost impossible to remove once formed and is becoming a more frequent problem, especially in Alaska and many foreign locations. In locations such as the North Sea, barium and strontium sulfate inhibition is becoming a major problem as waterflooding operations involving sea water increase.

THE INVENTION

The invention comprises a method of removing scale from and preventing scale from depositing in underground petroleum containing formations and upon equipment used to inject high brine scale forming waters into these formations. It comprises treating such waters with a scale inhibiting amount of a modified acrylamide homopolymer or an acrylic acid homopolymer. Also useful are modified co-polymers of acrylic acid with acrylamide. All these polymer have a molecular weight within the range of 1,000–80,000. They all have been modified to contain up to about 30 mole percent of amido($C_2$–$C_6$ alkyl)phosphinic acid groups and the alkali metal, ammonium and amine salts thereof.

The amount of polymers required to reduce scale and corrosion will vary depending upon the particular brine being treated and the conditions under which it is used. Dosages range from between as little as 0.05–1 part per million up to as much as 150 ppm. Typical dosages, however, are within the range of 0.1–10 ppm. They may be as high as 50 ppm. Routine experimentation can determine the exact amount of polymer that is necessary to achieve optimum results. These dosages relate to the dosages of the active polymer which are oftentimes supplied commercially in the form of aqueous solutions or as water-in-oil emulsion. The high brine scale forming waters treated by the invention contain at least 1,000 ppm total hardness. They often contain about 3,000 ppm or more of total hardness. The brines while usually containing calcium hardness contain a mixture of salts such as calcium carbonate, calcium sulfate, calcium phosphate and other scale producing salts. The inhibitors of the invention are particularly useful in treating barium and strontium scales, which as previously indicated are difficult to treat.

THE AMINOALKYLPHOSPHINATES USED TO PREPARE THE PHOSPHINATE POLYMERS

As indicated, these compounds contain $C_2$–$C_6$ alkyl groups which may be either straight or branched chain. In a preferred embodiment these compounds contain a hydroxy group in the alpha position.

Illustrative of such compounds are alpha-hydroxy-beta-aminoethylphosphinic acid, alpha-hydroxy-beta-aminoisopropylphosphinic acid and aminopropylphosphinic acid. Also included are their alkali metal salts, (e.g., sodium), ammonium and amine salts such as the trimethyl amine salt. They are capable of being used to introduce phosphinic acid and phosphinic acid salt groups into acrylic acid or acrylamide polymers.

The alpha-hydroxy-beta-aminoalkylphosphinic acids are conveniently prepared by the reaction of a haloalkyl-hydroxyphosphinic acid with ammonia. The starting haloalkyl-hydroxyphosphinic acids are described along with their method of preparation in the U.S. Pat. No. 4,598,092, the disclosure of which is incorporated herein by reference. This patent teaches that alpha-hydroxy-beta-haloethylphosphinic acid can be produced by reacting a haloacetaldehyde or its dialkyl acetals with aqueous phosphinic acid in the presence of an acid catalyst (e.g, hydrochloric acid, sulfuric acid), usually at a temperature of 10° to 100° C. for 1 to 24 hours. The amount of the phosphinic acid may be 1.0 to 10 equivalents to the haloacetaldehyde or its dialkylacetal. This reaction produces the compound

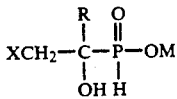

where M is H, alkali metal ammonia or amine, X is Cl or Br and R is H or a lower alkyl group such as $CH_3$, $C_2H_5$, etc.

These compounds are then reacted with aqueous concentrated solutions of ammonium hydroxide (e.g., about 20%) which are added to a chilled polar solvent solution of alpha-hydroxy-beta-haloalkylphosphinic acids and then heated to between 30°–70° C. for between about 2–10 hours. To illustrate this preparation the following is given by example.

EXAMPLE 1

A solution of

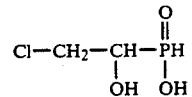

(98.55 g theoretical) in water (165 g) was cooled to 0° C. and 30% aqueous ammonia (442 ml) was added dropwise over 20 minutes. The mixture was then heated to 55° C. for five hours.

Using the above described preparative techniques, the following compounds were prepared: alpha-hydroxy-beta-aminoethylphosphinic acid and alpha-hydroxy-beta-aminoisopropylphosphinic acid. Structures of these compounds were confirmed by NMR.

In the case of aminopropylphosphinic acid, this compound is prepared by reacting allylamine with an alkali metal hypophosphite in the presence of a free radical catalyst. The reaction of olefinic groups with alkali metal hypophosphites to produce alkyl phosphinate salts is well known and is described in U.S. Pat. No. 4,590,014, the disclosure of which is incorporated herein by reference. The patent does not disclose the reaction of allylamine with alkali metal hypophosphites to produce aminopropyl(alkali metal)phosphinates. When the acid form of these salts is desired they can be prepared by treatment with dilute mineral acids or by the use of acid form cation exchange resins. The preparation of this compound is show below in Example 2.

EXAMPLE 2

Allylamine (30 g), sodium hypophosphite (50.95 g) and azobisisobutyronitrile (AIBN, 2.16 g) in 50% aqueous methanol (200 ml) were heated to 80° C. with vigorous stirring. Additional AIBN (2.16 g) was added portionwise over 5 minutes and the reaction was maintained at 80° C. for 6 hours.

THE STARTING ACRYLAMIDE AND ACRYLIC ACID POLYMERS AND CO-POLYMERS OF ACRYLIC ACID WITH ACRYLAMIDE

Homopolymers of acrylamide, acrylic acid and co-polymers of acrylic acid with acrylamide which are modified with the aminoalkylphosphinates should have a weight average molecular weight within the range of 1,000–100,000, preferably 1,000–40,000, and most preferably, 1,000–20,000. They are utilized in the reactions described hereafter in the form of aqueous solutions, typically having concentrations between 5%–30% by weight. When the starting polymers are acrylic acid and acrylamide co-polymers, the mole percent of acrylamide may vary between 5–95 to 95–5. Typically, however, these co-polymers will contain between 5–50 mole percent of acrylamide. The polymers may contain up to 15 mole percent of diluent monomers such as acrylonitrile, vinyl acetate, vinyl chloride and styrene.

MODIFICATION OF THE POLYMERS WITH

AAm is acrylamide, MAA is methacrylic acid and VAc is vinyl acetate.

TABLE 1

GENERAL PROCEDURE FOR MODIFICATION:
A mixture of the amine and the polymer solution were sealed in a reaction vessel capable of withstanding a pressurized chemical reaction and then heated to the specified temperature for the specified reaction time.

| SAMPLE | POLYMER COMPOSITION | MOL. Wt. | AMINOALKYL PHOSPHINIC ACID | MOL % CHARGE AMINE | RXN. TEMP. | RXN. TIME | RXN. pH |
|---|---|---|---|---|---|---|---|
| A | PAA | | $H_2NCH_2CH(OH)(PO_2H_2)$ | 5 | 150° C. | 5 HRS. | 9.0 |
| B | PAA | | $H_2NCH_2CH(OH)(PO_2H_2)$ | 15 | 150° C. | 5 HRS. | 6.3 |
| C | 50/50 AA/AAm | | $H_2NCH_2CH(OH)(PO_2H_2)$ | 10 | 150° C. | 5 HRS. | 6.5 |
| D | 50/30/20 AA/AAm/MAA | | $H_2NCH_2CH(OH)(PO_2H_2)$ | 10 | 150° C. | 5 HRS. | 4.0 |
| E | 45/50/5 AA/AAm/VAc | | $N_2NCH_2CH(OH)(PO_2H_2)$ | 10 | 150° C. | 5 HRS. | 3.7 |
| F | PAA | | $H_2NCH_2C(CH_3)(OH)PO_2H_2$ | 10 | 140° C. | 8 HRS. | 3.7 |
| G | 50/50/ AA/AAm | | $H_2NCH_2C(CH_3)(OH)PO_2H_2$ | 25 | 140° C. | 8 HRS. | 4.8 |
| H | PAA | | $H_2NCH_2CH{=}CH_2$ | 10 | 140° C. | 12 HRS. | 3.8 |
| I | 50/50 AA/AAm | | $H_2NCH_2CH{=}CH_2$ | 25 | 140° C. | 12 HRS. | 4.9 |
| J | AAm | | $NH_2CH_2CH_2CH_2(PO_2H_2)$ | 10 | 140° C. | 6 HRS. | 5.4 |

THE AMINO($C_2$-$C_6$ ALKYL)PHOSPHINIC ACID COMPOUNDS

The reaction of the aminoalkylphosphinic acids, or their salts, converts the carboxylic acid groups of the acrylic acid polymer into the corresponding amido groups by means of a simple amidation reaction. When the polymers contain acrylamide groups, the aminoalkylphosphinic acids or their salts undergo a transamidation reaction whereby the amine is substituted for the amide nitrogen in the acrylamide polymer.

The amount of substitution of the amino groups may be as little as 1 mole percent up to about as much as 30 mole percent; typically the substitution will be between 3–20 mole percent. The reaction using the conditions described hereafter results in about a 50% conversion (based on aminoalkylphosphinic acid charged) of the acid or amide groups to the amidoalkylphosphinates.

The reaction conditions used to either amidate the carboxylic acid or transamidate the amide groups are described in U.S. Pat. No. 4,678,840. This patent is primarily directed to transamidation reactions of aminoalkylphosphonates with acrylamide polymeric moieties contained in acrylic acid copolymers. U.S. Pat. No. 4,604,431 discloses reaction conditions for converting acrylic acid groups into amide groups by reacting them with aminosulfonic acid groups. The reaction conditions described in this patent are used to convert a portion of the acrylic acid groups in the homo- or co-polymers of acrylic acid into amidoalkylphosphinic acid groups or their salts. These patents are incorporated herein by reference.

In conducting the reactions described above, it is beneficial that the pH of the system be within the range of 3 to 11. A pH of 4 to 7 is preferred. Typical reaction temperatures and times are illustrated hereafter in Table 1.

A preferred method for introducing amidopropylphosphinic groups into the acrylic acid polymers or co-polymers thereof with acrylamide is to react these polymers with allylamine to produce the corresponding allylamides. These polymers containing the allylamide groups are then reacted with alkali metal hypophosphites in accordance with U.S. Pat. No. 4,590,014.

The preparation of the phosphinate-modified polymers is illustrated in Table 1. In Table 1 PAA and AA are polyacrylic acid and acrylic acid, respectively,

EVALUATION OF PHOSPHINIC ACID POLYMERS AS SCALE INHIBITORS

Test Methods

Static inhibition tests were used for evaluation. These included lab tests for calcium carbonate, calcium sulfate and barium sulfate and are described here.

$CaCO_3$ SCALE DEPOSITION TEST PROCEDURE

APPARATUS:
1. Constant temperature bath (100° to 200° F.).
2. Glass test cells (4-oz. bottles with screw lid).
3. Synthetic brines

| A. | 12.16 gms/L | $CaCl_2\ 2H_2O$ |
|---|---|---|
| | 3.68 gms/L | $MgCl_2\ 6H_2O$ |
| | 33.00 gms/L | NaCl |
| B. | 7.36 gms/L | $NaHCO_3$ |
| | 29.40 mg/L | $Na_2SO_4$ |
| | 33.00 gm/L | NaCl |

4. Graduated cylinders 2–50 mL.
5. Appropriate solutions of inhibitors to be tested.
6. Pipettes: 1–0.1 mL, 1–1.0 mL and 1–10 mL.
7. 125 mL Erlenmeyer flasks for each inhibitor to be tested.
8. Standard EDTA solution.
9. 6 normal sodium hydroxide
10. Ammonium purpurate indicator.
11. 10 mL micro buret.

PROCEDURE:
1. Using the appropriate solutions of inhibitors, pipette the desired amount of inhibitor into each cell.
2. Two controls (blanks) are set up with each test. Controls contain no inhibitor.
3. Brines A and B should be saturated with $CO_2$ for thirty minutes before using.
4. Add 50 mL of Brine A and B to each test cell.
5. Cap test cells and agitate to thoroughly mix brines and chemicals.
6. Put test cell in water bath at 160° F. for 24 hours.
7. After exposure at the 160° temperature for 24 hours, the test cells are removed and allowed to cool to room temperature.
8. Pipette 1 mL of the brine from each test cell and transfer to the Erlenmeyer flask.
9. Add 50 mL of distilled water to the Erlenmeyer.

10. Add 1 mL of 6N sodium hydroxide.
11. Add a small amount of ammonium purpurate indicator and titrate with the EDTA solution. The color changes from pink to violet.
12. The amount of $CaCO_3$ retained in solution is computed by multiplying the mL of standard EDTA solution used by 1000. The results are expressed as calcium carbonate.
13. A typical scale evaluation is found below:

| | CALCIUM CARBONATE RETAINED IN SOLUTION (Mg/L) | | | | |
|---|---|---|---|---|---|
| CHEMICAL | 1 PPM | 3 PPM | 5 PPM | 10 PPM | 20 PPM |
| A | 3,000 | 3,400 | 3,800 | 4,000 | 4,300 |
| B | 3,500 | 4,000 | 4,100 | 4,100 | 4,100 |
| C | 3,600 | 4,300 | 4,300 | 4,300 | 4,300 |

Blank (after precipitation) 2,600 mg/L as $CaCO_3$
Blank (before precipitation) 4,300 mg/L as $CaCO_3$ 14. Test results may also be recorded in percent inhibitor as illustrated below:

| | TEST RESULTS IN PERCENT INHIBITION | | | | |
|---|---|---|---|---|---|
| CHEMICAL | 1 PPM | 3 PPM | 5 PPM | 10 PPM | 20 PPM |
| A | 24 | 46 | 71 | 82 | 100 |
| B | 53 | 82 | 88 | 88 | 88 |
| C | 69 | 100 | 100 | 100 | 100 |

Blank (after precipitation) 2,600 mg/L as $CaCO_3$
Blank (before precipitation) 4,300 mg/L as $CaCO_3$

$CaSO_4$ DEPOSITION TEST PROCEDURE

This test is very similar to the calcium carbonate test previously described. The basic differences are the brine composition and elimination of the carbon dioxide saturation step. These synthetic brine compositions follow:

| | Synthetic brines | |
|---|---|---|
| A. | 7.50 gms/L | NaCl |
| | 11.10 gms/L | $CaCl_2$—$2H_2O$ |
| B. | 7.50 gms/L | NaCl |
| | 10.66 gms/L | $Na_2SO_4$ |

STANDARD $BaSO_4$ SCALE DEPOSITION TEST PROCEDURE

SOLUTIONS:
1. 1% or 0.1% distilled water solutions of the chemicals being tested.
2. Brine X
   42 grams of sea salt dissolved in distilled water to make one liter of Brine X
   Sea-Salt (ASTM D-1141-52)
3. Brine Y
   25 grams of analytical grade sodium chloride and 0.0456 grams of analytical grade $BaCl_2$-$2H_2O$ dissolved in distilled water to make one liter of Brine Y.
4. Brine Z
   50 grams of analytical grade $NaHCO_3$ dissolved in distilled water to make one liter of Brine Z.

PROCEDURE:
1. Saturate Brine Z for 15 minutes with $CO_2$.
2. Add chemical to be tested into a 4-ounce sample bottle.
3. Add 78 mL brine Y into 4-ounce bottle.
4. Add 20 mL brine X into the 4-ounce bottle.
5. Add 2 mL brine Z into the 4-ounce bottle.
6. Cap and shake bottle and then allow to stand 24 hours at room temperature.
7. Filter the sample through a 0.45 millipore filter and determine soluble barium.
8. The results are reported as percent inhibition using the following formula.

$$\text{Percent Inhibition} = \frac{(S - BAP)}{(BBP - BAP)} \times 100$$

Where:
BBP = Barium in sample before precipitation
BAP = Barium in untreated sample after precipitation
S = Barium in treated sample after precipitation
The barium concentration may be determined by any suitable method.

EXAMPLE 3

Polymers Evaluated

| | Backbone Polymers | | |
|---|---|---|---|
| SAMPLE NUMBER | POLYMER COMPOSITION-Mole % | MW | % POLYMER |
| 008 | 100% AA | 5400 | 35 |
| 009 | 50/50 AA/AAm | 2500 | 35 |

POLYMERS MODIFIED WITH ALPHA-HYDROXY-BETA-AMINOETHYL-PHOSPHINIC ACID

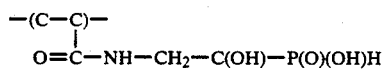

| SAMPLE NUMBER | BACKBONE POLYMER | PHOSPHINATE CHARGE (Mole %) | % POLYMER |
|---|---|---|---|
| 027 | 008 | 10 | 33.7 |
| 031 | 008 | 25 | 33.0 |
| 028 | 009 | 10 | 34.1 |
| 032 | 009 | 25 | 33.1 |

POLYMERS MODIFIED WITH ALPHA-HYDROXY-BETA-AMINOISOPROPYLPHOSPHINIC ACID

-continued

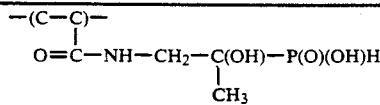

| SAMPLE NUMBER | BACKBONE POLYMER | PHOSPHINATE CHARGE (MOLE %) | % POLYMER |
|---|---|---|---|
| 039 | 008 | 10 | 33.9 |
| 045 | 008 | 25 | 33.4 |
| 040 | 009 | 10 | 34.3 |
| 046 | 009 | 25 | 33.5 |

POLYMERS MODIFIED WITH ALLYL AMINE, THEN NaH$_2$PO$_2$, AIBN

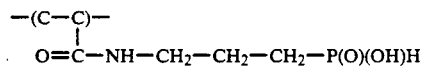

| SAMPLE NUMBER | BACKBONE POLYMER | AMINE CHARGE (MOLE %) | % POLYMER |
|---|---|---|---|
| 014 | 008 | 10 | 21.9 |
| 025 | 008 | 25 | 21.7 |
| 015 | 009 | 10 | 21.9 |
| 026 | 009 | 25 | 21.6 |

TABLE 2

CaCO$_3$ SCALE DEPOSITION TEST RESULTS

| INHIBITOR | INHIBITOR CONCENTRATION | | | | |
|---|---|---|---|---|---|
|  | 1 | 2 | 3 | 5 | 10 |
| −008 | 20 | — | 67 | 100 | 100 |
| −027 | 20 | — | 47 | 100 | 100 |
| −031 | 27 | — | 53 | 97 | 100 |
| −039 | — | — | 67 | 100 | 100 |
| −045 | — | — | — | 87 | 100 |
| −014 | — | — | — | 47 | 100 |
| −025 | — | — | — | 33 | 73 |
| −009 | — | — | — | — | 40 |
| −028 | — | — | 53 | 73 | 87 |
| −032 | — | — | 60 | 73 | 93 |
| −032 | — | — | 60 | 67 | 67 |
| −034 | — | — | 53 | 67 | 100 |
| −040 | — | — | — | — | 80 |
| −046 | — | — | — | — | 53 |
| −015 | — | — | — | 47 | 60 |
| −026 | — | — | — | — | 53 |

Blank before precipitation = 4200 mg/L Ca$^{++}$ as CaCO$_3$
Blank after precipitation = 2800 mg/L Ca$^{++}$ as CaCO$_3$

TABLE 3

CaSO$_4$ SCALE DEPOSITION TEST RESULTS

| INHIBITOR | INHIBITOR CONCENTRATION (ppm) | | |
|---|---|---|---|
|  | 0.3 | 0.5 | 1.0 |
| −008 | 64 | 55 | 100 |
| −027 | 18 | 73 | 100 |
| −031 | 9 | 27 | 100 |
| −039 | 36 | 100 | 100 |
| −045 | — | 27 | 100 |
| −014 | — | — | 55 |
| −025 | — | — | 27 |
| −009 | 18 | 64 | 100 |
| −028 | 27 | 73 | 100 |
| −032 | 55 | 98 | 100 |
| −032 | 27 | 82 | 100 |
| −034 | 45 | 55 | 100 |
| −040 | 18 | 55 | 100 |
| −046 | — | 36 | 100 |
| −015 | — | — | 64 |
| −026 | — | — | 45 |

Blank before precipitation = 3800 mg/L Ca$^{++}$ as CaCO$_3$
Blank after precipitation = 2700 mg/L Ca$^{++}$ as CaCO$_3$

TABLE 4

BaSO$_4$ SCALE DEPOSITION TEST RESULTS

| INHIBITOR | INHIBITOR CONCENTRATION (ppm) | | | | |
|---|---|---|---|---|---|
|  | 1 | 2 | 3 | 5 | 10 |
| −008 | 87 | — | 93 | 93 | 93 |
| −027 | 80 | — | 93 | 93 | 93 |
| −031 | 67 | — | 80 | 93 | 93 |
| −039 | 67 | — | 87 | 93 | 93 |
| −045 | 47 | — | 93 | 93 | 93 |
| −014 | 35 | — | 79 | 86 | 93 |
| −025 | 7 | — | 21 | 29 | 43 |
| −009 | 0 | — | 0 | 0 | 0 |
| −028 | 7 | — | 7 | 13 | 47 |
| −032 | 7 | — | 20 | 27 | 60 |
| −032 | 7 | — | 13 | 13 | 27 |
| −034 | 13 | — | 20 | 27 | 53 |
| −040 | 0 | — | 0 | 0 | 13 |
| −046 | 0 | — | 7 | 13 | 7 |
| −015 | 0 | — | 7 | 7 | 14 |
| −026 | 0 | — | 7 | 7 | 7 |

Blank before precipitation = 17 mg/L Ba$^{++}$
Blank after precipitation = 2 mg/L Ba$^{++}$ All of the phosphinate polymers useful in the practice of the invention are capable of being analyzed easily when present at a few parts per million. This cannot be done for the backbone polymers. This represents an important feature of the invention.

We claim:

1. A method of removing from and preventing scale from depositing in underground petroleum-containing formations and upon equipment used to inject scale-forming waters which contain at least 1,000 ppm total hardness into such formations which comprises treating such waters with a scale inhibiting amount of an acrylic acid or acrylamide homopolymer or co-polymer or acrylic acid with acrylamide having a molecular weight within the range of 1,000–50,000 which have been modified to contain from 1 to 30 mole percent of amido (C$_2$–C$_6$ alkyl) phosphinic acid groups and the alkali metal, ammonium and amine salts thereof.

2. The method of claim 1 where the amido(C$_2$–C$_6$ alkyl)phosphinic acid groups are from the group consisting of alpha-hydroxy-beta-amidoethylphosphinic acid, alpha-hydroxy-beta-amidoisopropylphosphinic acid and amido-propyl-phosphinic acid.

3. The method of claim 2 where the amido(C$_2$–C$_6$ alkyl)phosphinic acid group is alpha-hydroxy-beta-amidoethylphosphinic acid.

4. The method of claim 2 where the amido(C$_2$–C$_6$ alkyl)phosphinic acid group is alpha-hydroxy-beta-amidoisopropylphosphinic acid.

5. The method of claim 2 where the amido(C$_2$–C$_6$ alkyl)phosphinic acid group is amido-propylphosphinic acid.

* * * * *